Dec. 28, 1954    M. E. EVANS    2,697,971
PULL-OVER MECHANISM
Original Filed Oct. 10, 1949    2 Sheets-Sheet 1
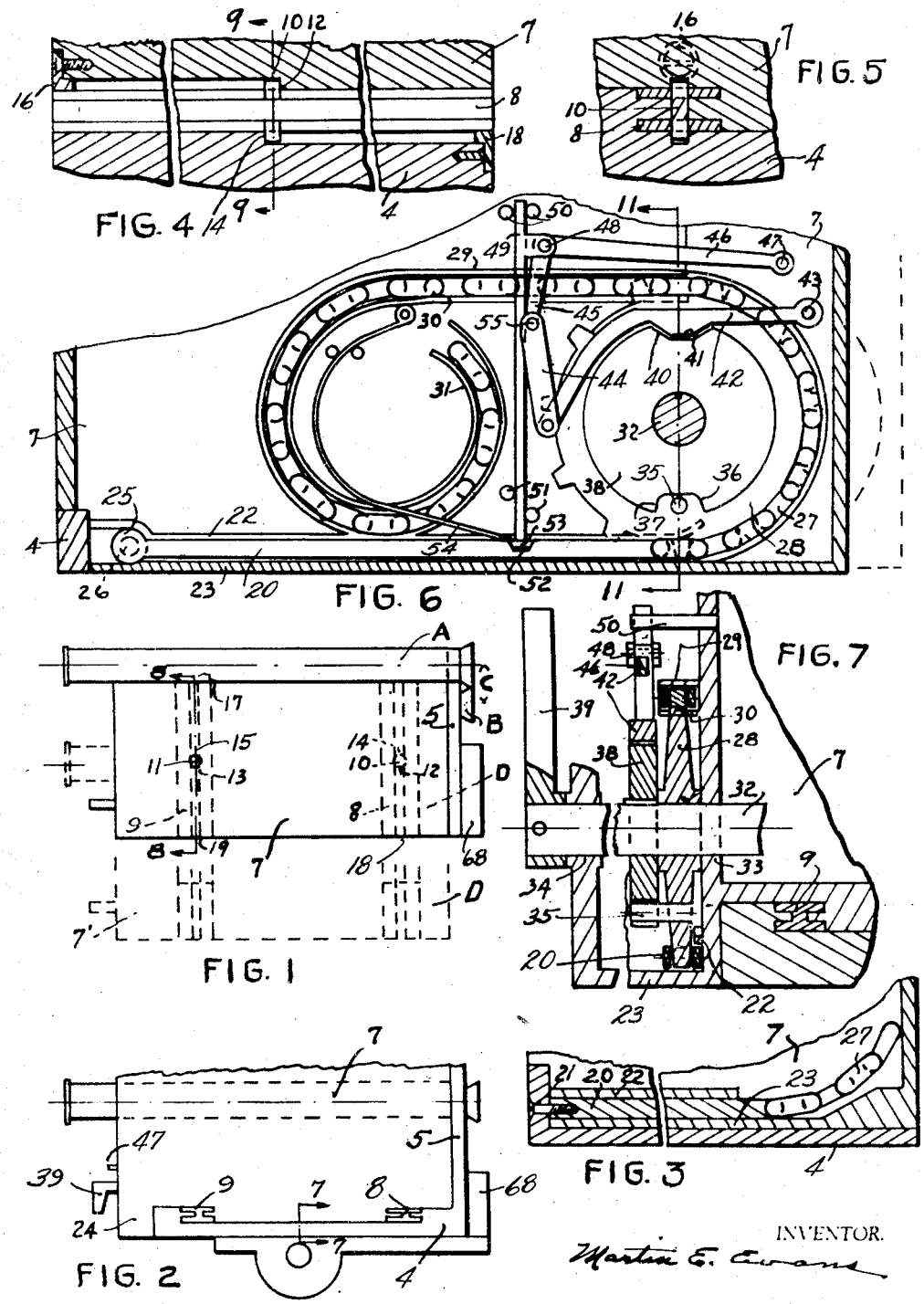
INVENTOR.
Martin E. Evans Dec. 28, 1954 M. E. EVANS 2,697,971
PULL-OVER MECHANISM Original Filed Oct. 10, 1949 2 Sheets-Sheet 2

INVENTOR.
Martin E. Evans

United States Patent Office 2,697,971
Patented Dec. 28, 1954

2,697,971

PULL-OVER MECHANISM

Martin E. Evans, Brooklyn, N. Y.

Original application October 10, 1949, Serial No. 120,563, now Patent No. 2,661,652, dated December 8, 1953. Divided and this application February 14, 1951, Serial No. 210,898

8 Claims. (Cl. 95—44)

This invention relates to improvements in cameras and more particularly to mechanism for shifting a motion picture camera case with respect to the exposure lense mounting.

Previous mechanisms of this character have been practically limited in the path of traverse to a distance suitable to shift the case with its film sufficiently to give a view of an image from the objective on an auxiliary screen for focusing purposes. This distance is usually the width of the film which is relatively short. It has been limited also by the overhang relation of the case to the base of the lens mount, the case and base width both being narrow.

It is an object of this invention to provide a mechanism for shifting the camera case relative to its supporting base to open and close a chamber to give access to a shutter and associated mechanism if such mechanism is utilized.

Another object is to provide a telescopic support for said case in its extended position. Another object is to provide means for actuating the operating elements and locking means including a single gear and chain shifting mechanism, and a single manually operated control member whose continuous movement effects release of the locking means and the shifting movement. A further object is to provide means to release the mechanism and locking means from movement by said manually operated member.

Another object is to provide a lost motion connection between a telescopic support and a camera case thereon.

Other objects will be obvious from the following specification in which

Fig. 1 is a plan view showing diagrammatically embodiments of this invention in a motion picture camera.

Fig. 2 is a partial side elevation of the camera shown in Fig. 1.

Fig. 3 is an enlarged detail in transverse sectional view through the camera case along line 7—7 of Fig. 2.

Fig. 4 is a sectional view longitudinally of a cantilever telescopic support for the camera case in side shifted position along line 8—8 of Fig. 1.

Fig. 5 is a sectional view along line 9—9 of Fig. 4.

Fig. 6 is an enlarged sectional view of the camera side shifting mechanism.

Fig. 7 is a sectional view along the line 11—11 of Fig. 6.

The subject matter of this invention is a division of copending application Serial No. 120,563, filed October 10, 1949, now Patent No. 2,661,652, the latter providing a motion picture camera with an adjustable shutter made available for adjustment by lateral movement of the case from behind the lens and its mount.

Figure 9:
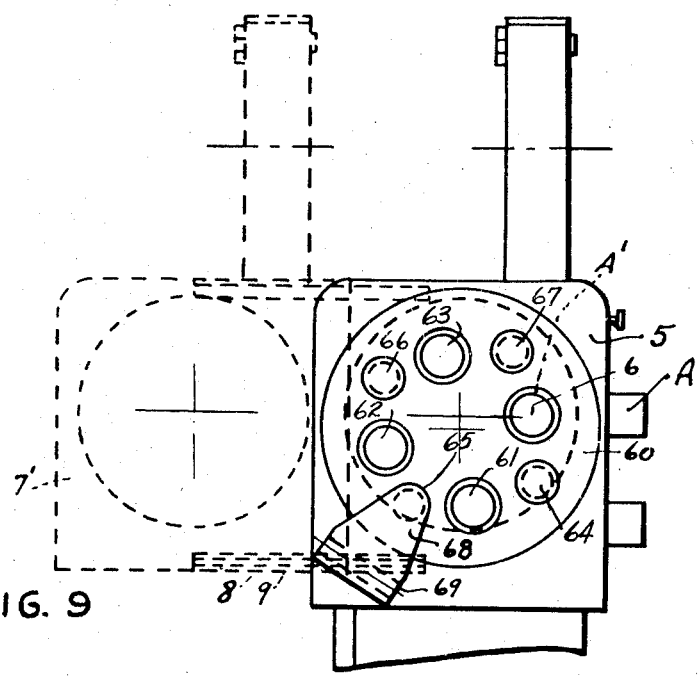
Fig. 9 is an end elevation of a camera showing the case and lens mount in extended relationship.

Referring to the drawings, Figs. 1, 2, 8 and 9, a pivoted head for mounting on a tripod carries a camera base 4 with a front upstanding member 5 on which is mounted lens 6. On the camera base 4 rests camera case 7 with grooved beams 8 and 9 between them holding the case and base in sidewise alignment by tongues from the members 4 and 7 fitting the grooves of 8 and 9. The degree of sidewise movement is shown in Fig. 9, where the outline 7' of the camera case 7 rests upon the beams 8 and 9 which are approximately half way extended from the base 4.

The travel of the beams 8 and 9 is limited by beam pins 10 and 11 which are upstanding in grooves 12 and 13 respectively in the camera case 7 and depending in grooves 14 and 15 in the camera base 4. The pins are located approximately midway of the beams' length. Depending shoulders or ends of the case grooves 12 and 13 and upstanding shoulders or ends of the camera base grooves 14 and 15 by contact with the pins 10 and 11 respectively, limit the travel of the case over the base in the contracting direction. Stops 16 and 17 at the ends of the respective case grooves and stops 18 and 19 at the ends of the respective base grooves limit the travel of the case in the out-going direction.

Mechanical means to shift the camera case with respect to the base on which the case rests is provided. Preferably it is located midway between the two beams 8 and 9 along section line 7—7 of Fig. 2, in which case to the base 4 shown in Fig. 3, a push-pull rod 20 is anchored by a fastening 21. The rod 20 is in a channel bounded on its upper side by a wall 22 and on its lower side by wall 23, the walls being a part of the camera case 7 which slide over the push and pull rod in consequence of the shift mechanism operation. The shift mechanism may be located in the end area 24 of the case, in which situation the push-pull rod 20 terminates in an anchor loop 25 which is held by a pin 26 to the base 4. The upper wall 22 extends over the rod 20 only so far as is required to retain the rod 20 and a chain extension 27 thereof in alignment during operation of the shift mechanism shown in Figs. 6 and 7. The chain 27 extends around a sprocket wheel 28 and between guide rails 29 and 30 which terminate in a spiral arrangement 31 providing storage for the chain 27 during the closed position of the case 7. Although the chain storage is shown to the left of the sprocket, it may be located above the sprocket. The sprocket 28 is loosely mounted on a shaft 32 carried in bearings 33 and 34 in the case 7. The sprocket is driven by a pin 35 which it carries extending toward the rear of the case 7 and between the shoulders 36 and 37 of a lost motion cam 38 keyed to the drive shaft 32 which is manually turned by a handle 39. Handle 39 is pinned to shaft 32. Diametrically opposed to the drive pin 35 is a groove 40 into which fits a shoe 41 carried by a lever 42 pivoted to the case 7 by pin 43. From the pivot 43 the lever 42 extends horizontally to the shoe and then curves downwardly to connect with the lower link 44 of a toggle completed by upper link 45. The link 45 is a down projecting arm of a bell crank the other arm 46 of which extends horizontally. The free end of the bell crank arm 46 carries a handle 47 which extends through the rear wall of case 7 above the shaft 32. The bell crank is pivoted at 48 to an upstanding member 49 slidable between upper pins 50 and lower pins 51 anchored to the wall of case 7. The lower end of the upstanding member 49 fits into a notch 52 in the rod 20 to hold the case 7 and base 4 in retracted position. The shoulder 53 on the lower end of the upstanding member is down pressed by a spring 54 anchored to the case 7. When the members 4 and 7 are extended over beams 8 and 9 the links of chain 27 provide notches for locking in extended position.

Referring to Figs. 3, 6 and 7, it is seen that the chain links 27 are constrained by guides 22 and 29 at the common point of tangency of the latter members with gear 28 during action of the latter in either direction. Particularly that part of guid 29 curved about the gear 28 is active in operation of the latter in both directions for holding the chain in engagement with the sprocket teeth. At the point of tangency noted the links there positioned in succession are traversed by the gear. This location of the gear and point of tangency at the lower advancing section of the case is strategic in that it provides for the maximum of chain traverse by the gear and thus the maximum of lateral movement of the case by the gear. It places the chain and columnar members in position to exert a lateral thrust on the support 4 as shown in Fig. 3. It makes the down set box part of case 7 adjacent base 4 (Fig. 7) and similar structure as in Fig. 3 available to enclose the columnar member 20 and the chain 27 thus to keep out dust and prevent binding operation. It facilitates the application of the mechanism to the stated preferred location between the beams 8 and 9 and aids the stated storage of chain above the gear thereby freeing the chain storage space shown in Fig. 7 to the film operating mechanism of the camera as fully illustrated in the parent application.

The shifting mechanism is practically wholly housed in the case with exterior attaching members 21 shown in Fig. 3 and 26 in Fig. 6 receiving the thrust and pull of the operating gear and chain.

In operation, assuming the members are in positions shown in Fig. 6, a turn clockwise of shaft 32 by crank 39 causes cam 38 to engage shoe 41 and raise lever 42 and the toggle 44—45 and the shoulder 53 against spring 54, thus releasing the case 7 to slide along tie rod 20. Further clockwise movement of cam 38 engages shoulder 36 against pin 35 and forces chain links 27 down against tie rod 20. Further clockwise movement pulls the stored chain 27 from spiral 31 and feeds it into the channel provided by members 22 and 23 of case 7. Outward movement is limited by stops 18 and 19 in the base 4. At this limit point the shoe 41 drops into the groove 40 and the member 49 settles into a holding position automatically. By raising the lever 46, the toggle 44—45 is shifted to the right as shown in Fig. 6 and there held by spring 54. Further turning of cam 38 then raises lever 42 without effect upon the stop pin 49. Locks at intermediate points are provided by lifting handle 47 and lever 46 which breaks the toggle 44—45, the joining pin 55 of which rests against the upstanding member 49. When the toggle is broken the spring forces the stop into a chain aperture.

For retraction, the handle 47 is lowered, thus the lever 46 through the bell-crank 45–44 re-establishes the toggle lock. Then the handle 39 and cam 38 are turned counter-clockwise to make groove 40 engage shoe 41, raise lever 42, toggle 44—45 and so release the stop from holding position. Further counterclockwise action of cam 38 brings shoulder 37 against drive pin 35 and turns sprocket 28 to pull chain over the wheel from the channel between members 22 and 23. This action forces a telescopic action of the beams 8 and 9 between case 7 and base 4. When the limit of telescopic action is reached the parts again assume the position shown in Fig. 6 and the automatic holding action by pin 49 is repeated. Again, locking of the pin 49 against action of cam 38 may occur as above mentioned.

There is thus provided a stop against telescopic and case movement and a lock on the stop so that it may not be operated inadvertently at two predetermined points in the operative path of the case, i. e., at the terminal expansion and retraction points for the case and beams. The shoe 41 traverses the circumference of cam 38 in the transit of the stop 39 from one terminal to the other.

The extreme outgoing action described separates case 7 from upstanding member 5 and makes accessible for adjustment the shutter disks and associated mechanisms or devices. The lesser outgoing action aligns the focusing finder A in the position A' behind the objective 6. In either case the stop rod 49 cooperates with the chain to hold the case, and the bar 20 becomes a columnar member or a tension member according to the force exerted thereon by the case. Operation of the member 39 through the shaft 32 sequentially operates the stop rod 49 and the gear 28, and the bar 20 again becomes a columnar member or tension member according to the direction of operation of member 39. In the sequence of operations, the lifting of the stop precedes the operation of the gear for both outgoing and retraction movements of the case.

Figure 8:
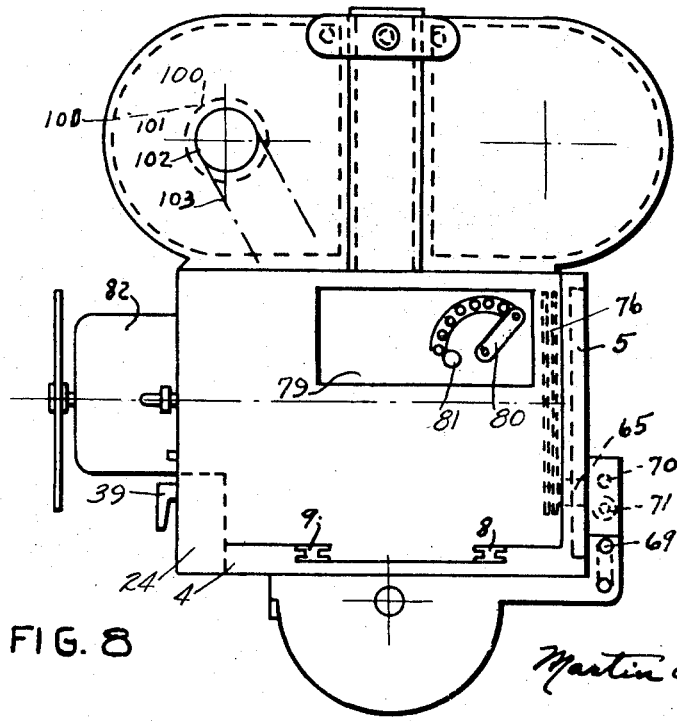
Fig. 8 is a side elevation of a camera showing parts of the invention.

The shutter 76 is shown diagrammatically by parallel dotted lines in Fig. 8 and as the dotted circle in Fig. 9 in the extended position 7' of the case 7. In the latter figure the shutter is shown as fully accessible. Complete details of the shutter are shown in the parent application.

Again referring to Figs. 1, 8 and 9, the distance C between the focusing view finder A and the objective B represents the usual lateral shifting movement of the case 7 relative to the objective 6 and its support 5. To shift the case 7 laterally to position 7' which is sufficient to remove cover 5 from chamber D and expose shutter 76 therein requires a shifting distance greater than C. The support of case 7 by case 4 then becomes insecure. A lateral extension of the base becomes essential, but a solid extension becomes bothersome in handling the camera, is unsightly and objectionable. Therefore lateral cantilever extensions 8 and 9, telescopic in action, are provided, with lost motion connections between the base 4 and case 7. It is obvious that the center of gravity of the case is carried beyond the support of the base and a telescopic cantilever support is supplied to stabilize the case on the base.

During the initial part of extension movement of case 7 to position 7' (Fig. 1), the stop 16 moves up to pin 10 and stop 12 moves away therefrom (Fig. 4). This is a lost motion interval for the beam and pin. Thereafter as the case continues to position 7' the pin and beam move jointly with the case.

During the initial part of reverse movement of case 7 from position 7', the stop 16 moves away from the pin 10 and stop 12 moves up thereto. This is also a lost motion interval for the beam and pin. Thereafter as the case continues its reverse movement to the original position the pin and beam move jointly with the case.

The arrangement for lost motion between the beams and the case is an operating connection of the beams to the shifting mechanism in the case whereby the case and beams are differentially positioned by operation of the shifting mechanism during extension movement and are positioned together during reverse movement. The case has a relatively long path of travel, the beams have relatively short ones. While the beams and case travel at the same linear rate, the differential placement is obtained by starting the beam after the case has moved well along its path. The lost motion connection arranges for this later start and thus for the desired placements, separate on the extension movement, together on the reverse movement.

When the stop 49 immobilizes the shifting mechanism at the ends of extension and reverse movements the stops on the case and base and the pins on the beams coact to retain the latter in their appointed positions. The stop 49 is thus a beam stop as well as a case stop at two predetermined positions, i. e., at the end of the extension movement and at the end of the reverse movement.

It will be apparent that various mechanical arrangements and devices other than those illustrated and described may be employed to effect the modes of operation and the results of the mechanical arrangements and constructions I have illustrated and described for illustrative purposes. Such arrangements and many variations and modifications of the apparatus illustrated and described will readily occur to those skilled in the art to which the invention is related and my invention should therefore be understood as not restricted to the specific embodiments illustrated and described but as including all arrangements, modifications and additions coming within the scope of the claims which follow.

I claim:

1. In combination, a support, a camera case, a connection allowing sliding movement of the latter on the former, a guideway in the case, a bar with a chain attached thereto in the guideway, a connection between the bar and the support, a chain sprocket with the bar guideway tangent thereto and the chain therearound so that as the guideway moves the bar is uncovered and the chain is fed by the sprocket into the guideway in the place vacated by the bar, a free supply of chain available to the sprocket, and means to rotate the sprocket in opposite directions.

2. In combination, a support, a camera case, a connection allowing sliding movement of the latter on the former, a guideway in the case, a bar with a chain attached thereto in the guideway, a connection between the bar and the support, a chain sprocket with the bar guideway tangent thereto and the chain therearound so that as the guideway moves the bar emerges and the chain is fed by the sprocket into the bar guideway where vacated by the bar, a free supply of chain available to the sprocket, means to rotate the sprocket in opposite directions and case holding means with an operating connection to said rotating means.

3. In combination, a support, a camera case on the support, a connection therebetween allowing movement of the latter on the former, a guideway in the case, a bar with a chain attached thereto in the guideway, a connection between the bar and the support, a chain sprocket with the bar guideway tangent thereto and the chain therearound so that as the guideway moves the bar emerges therefrom at one end and is replaced by the chain at the other end, the chain being forced by the sprocket into said position, a free supply of chain available to the sprocket, means to rotate the sprocket in opposite directions, and case holding means with releasing means having an operating connection to said rotating means.

4. In combination, a support, a camera case on the support, a connection therebetween allowing movement of the latter on the former, a guideway in the case, a bar with a chain attached thereto in the guideway, a connection between the bar and the support, a chain sprocket with the bar guideway tangent thereto and the chain therearound so that as the guideway moves the bar emerges therefrom at one end and is replaced by the chain at the other end, the chain being forced by the sprocket into said position and supported laterally by the guideway, a free supply of chain available to the sprocket, means to rotate the sprocket in opposite directions, case locking means with releasing means having an operating connection to said sprocket rotating means, the latter including a lost motion connection, said releasing means and sprocket rotating means providing a sequence so that the stop is released before the gear starts turning.

5. In combination, a support, a camera case on said support, a connection therebetween allowing movement of the case on the support, a guideway in the case, a bar with a chain attached thereto in the guideway, a connection between the bar and the support, a chain sprocket with the bar guideway tangent thereto and the chain therearound so that as the guideway moves, the bar emerges therefrom at one end and is replaced by chain at the other end, the chain being forced by the sprocket into said position and supported laterally by the guideway, a free supply of chain available to the sprocket, means including a lost motion connection to rotate the sprocket in opposite directions, case locking means, including a holding member with releasing means therefor, having an operating connection to said sprocket rotating means, said holding member being automatically operable to releasably maintain the case in either of two positions, means to sustain said holding member out of action between said positions, and means manually operable for releasing said holding means from said sustained position between said predetermined positions for holding action.

6. In combination, a support, a camera case on said support, a connection between said members allowing sliding movement of the case, a guideway in the case, a bar with a chain attached thereto in the guideway, a connection between the bar and the support, a chain sprocket with the bar guideway tangent thereto and the chain around the sprocket so that as the guideway moves the bar emerges therefrom at one end and is replaced by chain at the other end, the chain being forced by the sprocket into said position and supported laterally by the guideway, a free supply of chain available to the sprocket, means, including a lost motion connection, to rotate the sprocket in opposite directions, case locking means, including a holding member with releasing means therefor having an operating connection to said sprocket rotating means and operable automatically at two predetermined positions to releasably hold said case, said locking means and said sprocket rotating means having an operating sequence releasing the holding member from locking position before the gear starts to turn.

7. In combination, a support, a camera case on the support, a sliding connection between the support and case, a guideway in the case, a bar with a chain attached thereto in the guideway, a connection between the bar and the support, a chain sprocket with the bar guideway tangent thereto and the chain around the sprocket so that as the bar emerges from the guide at one end it is replaced in the guideway at the other end by the chain, the chain being forced by the sprocket into said position and supported laterally by the guideway, a free supply of chain available to the sprocket, a reversible actuating shaft supporting said sprocket rotatably thereon, a driving connection, including a driver and driven member constituting a lost motion device between said shaft and sprocket, case locking means, including a holding member with releasing means therefor having an operating connection to said shaft, said locking means and said lost motion means having an operating sequence releasing the holding member from locking position before the sprocket starts to turn.

8. In a pullover mechanism of the character set forth in claim 7, means, manually operable, for making and breaking the operating connection between said holding member and said actuating shaft whereby said holding member by the breaking action is allowed to lock the case until the connection is remade.

References Cited in the file of this patent

UNITED STATES PATENTS

| Number | Name | Date |
| --- | --- | --- |
| 753,800 | Locke | Mar. 1, 1904 |
| 782,649 | Goddard | Feb. 14, 1905 |
| 922,138 | Hendler | May 18, 1909 |
| 1,029,296 | Holst | June 11, 1912 |
| 1,194,657 | Overman | Aug. 15, 1916 |
| 1,297,704 | Leonard | Mar. 18, 1919 |
| 1,551,698 | Robertson | Sept. 1, 1925 |
| 1,627,722 | Balstron | May 10, 1927 |
| 1,996,481 | Morgan | Apr. 2, 1935 |

FOREIGN PATENTS

| Number | Country | Date |
| --- | --- | --- |
| 253,967 | Switzerland | Dec. 1, 1948 |